(12) United States Patent
Bifulco et al.

(10) Patent No.: US 10,911,376 B2
(45) Date of Patent: Feb. 2, 2021

(54) SOFTWARE-ENHANCED STATEFUL SWITCHING ARCHITECTURE

(71) Applicant: NEC Laboratories Europe GmbH, Heidelberg (DE)

(72) Inventors: Roberto Bifulco, Heidelberg (DE); Anton Matsiuk, Hamburg (DE)

(73) Assignee: NEC CORPORATION, Tokyo (JP)

(*) Notice: Subject to any disclaimer, the term of this patent is extended or adjusted under 35 U.S.C. 154(b) by 14 days.

(21) Appl. No.: 16/068,115

(22) PCT Filed: Mar. 31, 2016

(86) PCT No.: PCT/EP2016/057135
§ 371 (c)(1),
(2) Date: Jul. 4, 2018

(87) PCT Pub. No.: WO2017/167385
PCT Pub. Date: Oct. 5, 2017

(65) Prior Publication Data
US 2019/0014061 A1  Jan. 10, 2019

(51) Int. Cl.
*H04L 12/935* (2013.01)
*H04L 12/931* (2013.01)
(Continued)

(52) U.S. Cl.
CPC .......... *H04L 49/3009* (2013.01); *H04L 45/38* (2013.01); *H04L 45/64* (2013.01);
(Continued)

(58) Field of Classification Search
None
See application file for complete search history.

(56) References Cited

U.S. PATENT DOCUMENTS 7,606,263 B1* 10/2009 Parker .................. H04L 45/745
370/392
2005/0226235 A1* 10/2005 Kumar ................ H04L 47/2441
370/386
(Continued)

FOREIGN PATENT DOCUMENTS

WO    WO 2016008934 A1    1/2016

OTHER PUBLICATIONS

C Cascone et al: "OpenState: platform-agnostic behavioral (stateful) forwarding via minimal OpenFlow extensions*", Roma Univ, Vergata Tor, Jul. 2, 2015 (Jul. 2, 2015), XP055329708, the whole document.
(Continued)

*Primary Examiner* — Andre Tacdiran
(74) *Attorney, Agent, or Firm* — Leydig, Voit & Mayer, Ltd.

(57) ABSTRACT

A stateful network packet processing system includes first and second stateful stages and a distribution mechanism. The first stateful stage includes a first state table and a first FSM table. The second stateful stage includes a second state table and a second FSM table. The distribution mechanism defines when a flow should be processed by either the first stateful stage or the second stateful stage or by a combination of the first stateful stage and the second stateful stage. At least one of the first or second FSM tables is extended with states and transitions that support the distribution mechanism.

11 Claims, 6 Drawing Sheets

(51) Int. Cl.
*H04L 12/721* (2013.01)
*H04L 12/715* (2013.01)
*H04L 12/741* (2013.01)

(52) U.S. Cl.
CPC ............ *H04L 49/355* (2013.01); *H04L 49/70* (2013.01); *H04L 45/745* (2013.01)

(56) References Cited

U.S. PATENT DOCUMENTS

| | | | | |
|---|---|---|---|---|
| 2005/0228851 | A1* | 10/2005 | Cornett | H04L 45/00 709/200 |
| 2008/0189769 | A1* | 8/2008 | Casado | G06F 21/85 726/4 |
| 2013/0058208 | A1* | 3/2013 | Pfaff | H04L 12/4633 370/217 |
| 2015/0040115 | A1* | 2/2015 | Capper | G06F 8/65 717/171 |
| 2015/0236904 | A1* | 8/2015 | Tsui | H04L 69/16 709/222 |
| 2015/0333929 | A1* | 11/2015 | Le | H04L 12/6418 711/108 |
| 2017/0317930 | A1* | 11/2017 | Bianchi | H04L 45/56 |

OTHER PUBLICATIONS

Zhu Shuyong et al: "SDPA: Enhancing Stateful Forwarding for Soft-Defined Networking", 2015 IEEE 23$^{rd}$ International Conference on Network Protocols (ICNP), IEEE, Nov. 10, 2015 (Nov. 10, 2015), pp. 323-333, XP032883882.

* cited by examiner

SOFTWARE-ENHANCED STATEFUL SWITCHING ARCHITECTURE

CROSS-REFERENCE TO PRIOR APPLICATION

This application is a U.S. National Stage Application under 35 U.S.C. § 371 of International Application No. PCT/EP2016/057135 filed on Mar. 31, 2016. The International Application was published in English on Oct. 5, 2017 as WO 2017/167385 A1 under PCT Article 21(2).

FIELD

The present invention generally relates to a stateful packet processing system.

BACKGROUND

The Software-Defined Networking (SDN) paradigm brings a separation of packet forwarding (data plane) and the control plane functions. Being widely adopted, the OpenFlow protocol provides flow-level abstractions for remote programming of switch's data plane from a centralized controller. A controller instructs an underlying switch with per-flow rules by means of specific Flow_Mod messages. Such message contains match and action parts with the first specifying the packet headers to match and with the second applying a particular processing decision to all the packets belonging to the specified flow. These forwarding rules are translated into the forwarding table statements and become installed into one or several forwarding tables of a table pipeline (as specified in "Openflow Switch Specification," version 1.1.0 (Feb. 28, 2011) (available at archive.openflow.org/). Such forwarding abstraction implies stateless packet processing in the table pipeline, meaning that any possible state transitions of any particular flow may be implemented only on the controller's side. This means that any forwarding logic that needs stateful packet processing requires several interactions between the switch and the controller. Examples of stateful processing applications which may involve such interactions are: traffic anomalies detection, firewall-like primitives (e.g. reflexive ACL), adaptive QoS enforcement, etc.

OpenState (as described, for instance, in Giuseppe Bianchi, Marco Bonola, Antonio Capone, and Carmelo Cascone: "OpenState: Programming Platform-independent Stateful OpenFlow Applications Inside the Switch", in SIGCOMM Comput. Commun. Rev. 44, 2 (April 2014), 44-51) enables an extension to flow-oriented stateless processing which enhances forwarding engines with an eXtended Finite State Machine (XFSM). This extension allows to track the state of each flow in the switching pipeline and to perform transitions of this state by adding to the stateless forwarding architecture two tables: state table and XFSM (or, briefly, FSM) table.

State table, as the first of the two tables of the architecture, is a key-value first-match-lookup table. In the state table a first-match lookup is performed to match some packet header(s) of an incoming flow against the state associated with this flow. In the FSM table, a combination of packet headers and the transferred state is a key for the next lookup. If a flow's state update is needed, a feedback loop becomes involved between the two tables passing a message with a state update for a particular flow from the FSM table to the state table.

SUMMARY

In an embodiment, the present invention provides a stateful network packet processing system. The stateful network packing processing system includes: a first stateful stage including a first state table and a first finite state machine ("FSM") table]; a second stateful stage including a second state table and a second FSM table; and a distribution mechanism that defines when a flow should be processed by either the first stateful stage or the second stateful stage or by a combination of the first stateful stage and the second stateful stage. At least one of the first FSM tables or the second FSM table is extended with states and transitions that support the distribution mechanism.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
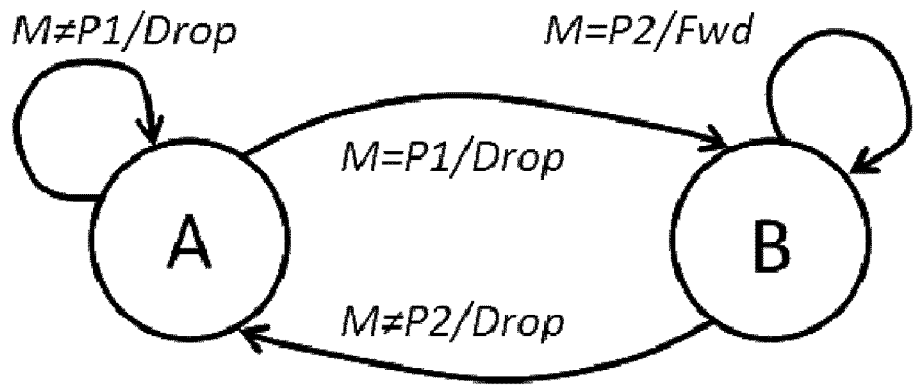
FIG. 1 is a schematic view illustrating a two-phase port knocking application FSM.

Switching platforms as the one described above have certain limitations. Certainly one of the most relevant limitations is that the state table needs to maintain a separate record for every new incoming flow (i.e. for every new connection from a remote host). This architectural decision imposes a severe scalability issue for a switching architecture. Furthermore, current hardware-based OpenFlow-enabled switches have a number of technological limitations which create obstacles on the way to a massive adoption and deployment of SDN. In such switches, flexible lookup flow tables are typically implemented with specialized memories, such as TCAMs, which are limited in size (number of records), power hungry and expensive. Together with the size limitation, such flow tables are slow in its update speed. In contrast to hardware switching platforms, software switches (for reference, see openvswitch.org) use traditional RAM memory to store its match tables in combination with CPU-based forwarding. Typically, such switches do not lack flow tables' capacity, however their forwarding capabilities are significantly inferior to the capabilities of the hardware ones.

In view of the above, aspects of the present invention improve and further develop a stateful packet processing system in such a way that the scalability of the system is increased.

In accordance with the invention, the aforementioned aspect is accomplished, for example, by a stateful network packet processing system, including a first stateful stage including a first state table and a first finite state machine, FSM, table, a second stateful stage including a second state table and a second FSM table, and a distribution mechanism that defines when a flow should be processed by either the first or the second stateful stage or by a combination of the two stateful stages. At least one of the two FSM tables may extend with states and transitions that support the distribution mechanism.

According to embodiments of the invention, an increased scalability of stateful SDN switches can be achieved by means of a hybrid switch that combines at least two stateful stages, each comprising a state table and an FSM table, together with a distribution mechanism that specifies when a flow should be handled by one or by the other FSM table. According to embodiments of the invention, an original FSM can be transformed, by means of applying an FSM adaptation technique, into an FSM that can be split between two different FSM executors, e.g., a software and a hardware executor, using the above mentioned distribution mechanism. The hybrid switch that combines at least two stateful stages as mentioned above can be configured to execute the FSM obtained in this way. This can be performed by generating state transition entries for the two stateful stages, such that the handling of a network packet by the switch according to the required forwarding behavior can be performed by the first stage, by the second stage, or by a combination of the two. The forwarding behavior implementation is split between the two stages according to the defined distribution mechanism. Due to the two stages operating in parallel, the total number of supported flows is significantly extended, resulting in an increased scalability.

According to an embodiment of the present invention, the first stateful stage and the second stateful stage are implemented in different, i.e. heterogeneous, technologies, which proves to be beneficial in terms of enhanced robustness against failures related to a particular technology. However, it is also possible to implement both stateful stages in the same technology. This solution will still help to cope with certain situations, e.g., in case one of the stages is affected by a virus or the like.

According to an embodiment, the first stateful stage is implemented in hardware and includes a hardware state table, HST, and a hardware FSM table, HFSMT, and the second stateful stage is implemented in software and includes a software state table, SST, and a software FSM table, SFSMT. This implementation is most advantageous since it combines benefits of software- and hardware-based forwarding platforms, while eliminating the drawbacks of both solutions. In particular, the hardware stateful stage may be implemented as a TCAM (Ternary Content-Addressable Memory) based stage. TCAMs are very fast in forwarding packets, but may hold just a limited number of entries, for instance 10,000. This drawback can be compensated for by implementing the second stage in software, for instance as a combination of a general purpose processor with a DRAM memory (Dynamic Random Access Memory), which may have limited forwarding performance, while providing the ability to accommodate millions of entries.

According to an embodiment, each of the two stateful stages may include a key extractor module that is configured to derive from a network packet's header a particular value that represents a key for the match fields of the state tables. The key extractor module may provide and manage a feedback loop between the tables in case a flow's state update is needed. To this end the key extractor module may be configured to pass the particular value together with information on the state of the network packet, i.e. either the current state or the state associated to the network packet in the FSM table (denoted 'next_state' in some embodiments), to a respective one of the two state tables. More specifically, if a flow's state update is needed, a feedback loop becomes involved between two tables passing a set_state: pkt_headers+next_state message with an update for a particular flow. The key extractor module passes the particular value together with next_state to the state table, thus either updating an existing state table entry or installing a new one.

According to an embodiment it may be provided that the hardware state table, HST, by default, contains only a single low-priority entry with a wildcard match and a software indicating state ('SW') as associated state. As a consequence, all newly arriving flows that initially do not have an associated fine-grained entry in the HST, will be handled by the default entry, i.e. they become redirected to the software pipeline for further processing. In addition, it may be provided that the hardware FSM table, HFSMT, by default, contains an entry that is associated with the 'SW' state and that specifies an action that redirects matching packets to the software state table, SST. According to an embodiment, this redirection of matching packets from the HFSMT to the SST may be implemented by using dedicated OpenFlow instructions (for instance, "Goto-Table" instructions).

According to an embodiment at least one of the two stateful stages may comprise an evaluation module for executing the distribution mechanism, wherein the evaluation module is configured to provide a criterion for moving a particular flow from one of the two stateful stages to the respective other stateful stage. That is, the forwarding behavior implementation is split between the two stateful stages according to the given criterion, for example, but not limited to, performance criterion based on the number of received packets, the number of transferred bytes, etc. In particular, the evaluation module may be configured to translate an evaluation performed on flow and/or packet statistics into a binary variable. For instance, the evaluation module may output a value 'true' in case an evaluation of, e.g., the number of packets of a particular flow results in that this number exceeds a predefined threshold, and may output the value 'false' as long as the number of packets is below this threshold. With respect to an efficient employment of the binary variable, it may be provided that the FSM tables are extended by an additional field that matches against these binary values 'true'/'false'.

According to an embodiment the evaluation module may be provided with the software stage and may be configured to execute the distribution mechanism in form of a one-way offloading scheme that triggers transitions from the software stateful stage to the hardware stateful stage if certain predefined conditions are fulfilled, i.e. based on the value of the binary variable. In this scenario all new flows arriving at the switch may initially be transferred to the software pipeline, from where they are then eventually offloaded to the hardware pipeline (depending on the value of the binary variable).

According to an embodiment the two stateful stages may be implemented by using two physically separated datapaths that are linked with each other by an external connection. That is, from the perspective of, e.g., a hardware pipeline, the corresponding software pipeline may be realized in an external software switch.

According to an embodiment the system may comprise one or more supplemental stateful stages in addition to the first and the second stateful stages. As will be appreciated by those skilled in the art the operational scheme of such multi-stage (n>2) packet processing platform may be straightforwardly derived from the operational scheme of the two stage case.

There are several ways how to design and further develop the teaching of the present invention in an advantageous way.

FIG. 1 schematically illustrates the concept of a stateful SDN (Software Defined Network) switch that provides an extension to flow-oriented stateless processing by means of implementing an FSM (Finite State Machine) table in addition to the state table. This extension allows to track the state of each flow in the switching pipeline and to perform transitions of this state.

Specifically, FIG. 1 represents an example of a simple stateful packet processing application known as "Port knocking" (for reference, see Giuseppe Bianchi, Marco Bonola, Antonio Capone, and Carmelo Cascone: "OpenState: Programming Platform-independent Stateful OpenFlow Applications Inside the Switch", in SIGCOMM Comput. Commun. Rev. 44, 2 (April 2014), 44-51). This application opens a transport port in the system for a particular remote host (e.g. TCP port for an SSH connection) after incoming flow's packets were destined to a predefined port sequence. If the port sequence matches a predefined one in the FSM (which in the illustrated example is the sequence of TCP destination ports=[P1, P2]), the connection moves from an established state (i.e. A/Drop) to another established state (i.e. B/Fwd), i.e. all the subsequent packets of the same connection are forwarded.

In detail, if the match M on port P1 fails, the respective packet is dropped and the system remains in state A. If this match is successful, the respective packet is still dropped, but the system performs a switch to state B. Once in state B, if a match on port P2 is successful, the system remains in state B and all subsequent packets of the respective connection are forwarded. As soon as the match on port P2 fails the respective packet is dropped, and the system returns to state A.

Figure 2:
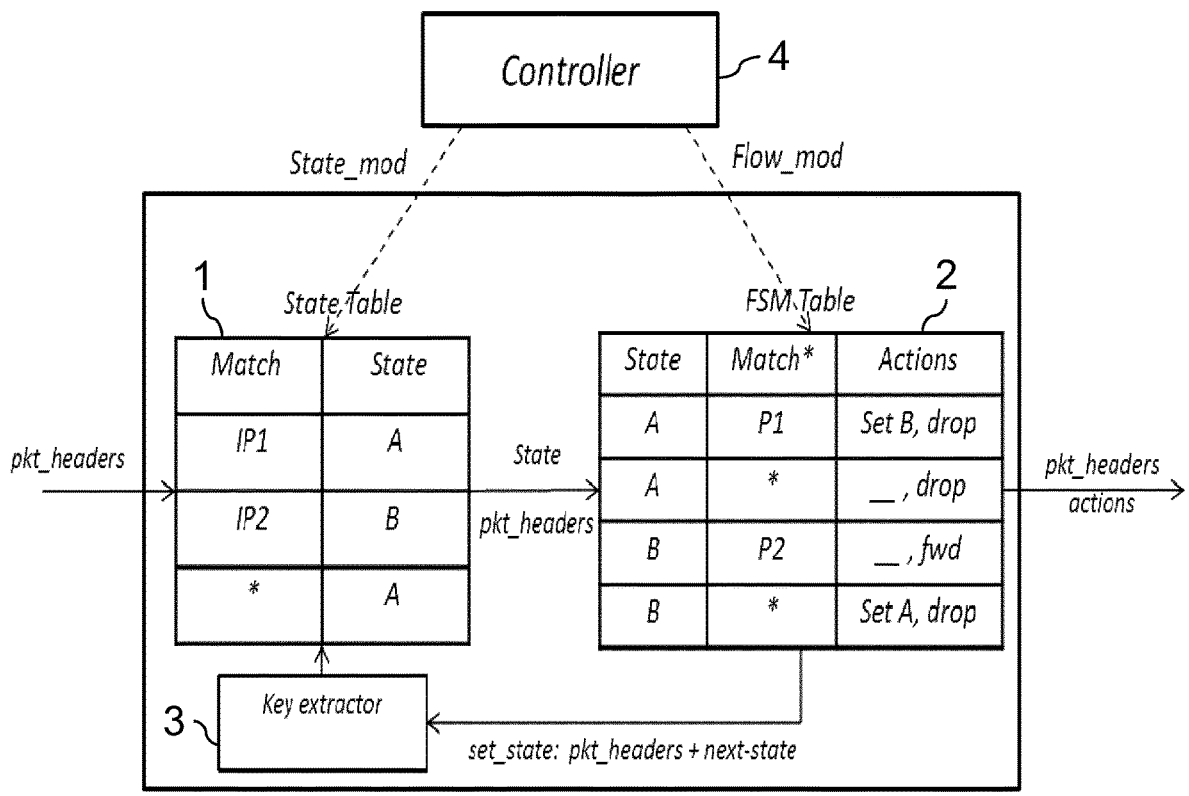
FIG. 2 is a schematic view illustrating a stateful switching architecture implementing the port knocking application of FIG. 1.

To compile the described logic, the switching pipeline needs to be modified as depicted in FIG. 2. Here, the state table 1 is the first of the two tables of the architecture. In this state table 1, which is a key-value first-match-lookup table, a first-match lookup is performed to match some packet header(s) of an incoming flow against the state associated with this flow. The records in the table 1 are ordered e.g. by means of OpenFlow priority attributes. For instance, in the port knocking example of FIG. 1, such a field may match against the source IP address of every remote host which initiates the connection. The lookup returns a value, which is a state associated with the incoming flow (host) or a default state value associated with the wildcard match (MATCH_ALL in OpenFlow terms). This state is then passed together with the corresponding packet headers to the second stage—the FSM table 2. The state transfer between the tables 1, 2 of a switching pipeline may be performed by using metadata fields.

In the FSM table 2, a combination of packet headers and the transferred state is a key for the next lookup. In this context it should be noted that match fields in the FSM table 2 (denoted 'Match*' in FIG. 2, as well as in all subsequent figures) are generally independent from the match field(s) in the state table 1 (denoted 'Match'). In the port knocking example, the match field in the FSM table 2 is the TCP destination port. Depending on the combination of the state and the Match* fields, actions for flow processing and its state update (if needed) are taken, which are in accordance with the FSM described in connection with FIG. 1. If a flow's state update is needed, a feedback loop becomes involved between the two tables 1, 2 passing a set_state: pkt_headers+next_state message with an update for a particular flow. A key extractor module 3 derives a particular value(s) for the match field(s) of the state table 1 from the packet headers and passes it together with next state to the state table 1, thus either updating an existing record or installing a new one. The initial programming of both tables 1, 2 happens from the centralized controller 4 by means of State_mod and Flow_mod messages, as indicated by the dotted lines in FIG. 2. In this regard it should be noted that the state table 1 requires in this example only a single State_mod message with a default match/state decision (shown at the bottom of the state table), while all the subsequent updates happen through the feedback loop.

Figure 3:
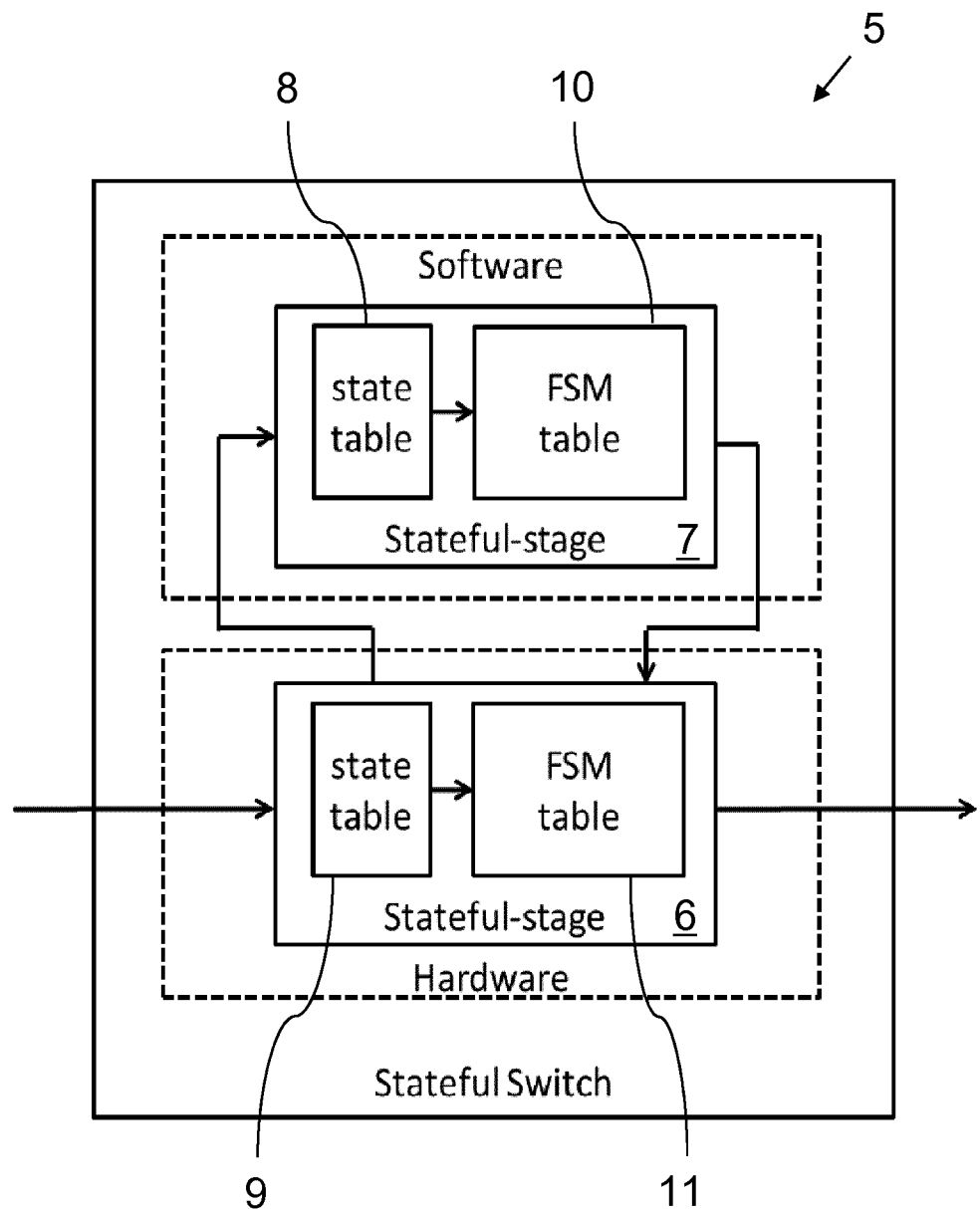
FIG. 3 is a schematic view illustrating the general concept of a stateful switch architecture in accordance with embodiments of the present invention.

FIG. 3 is a schematic view illustrating the general concept of a stateful switch architecture 5 in accordance with embodiments of the present invention, the switch architecture 5 including two stateful stages 6, 7, one implemented in hardware and the other implemented in software. This embodiment provides a software-enhanced stateful packet processing architecture, which effectively combines benefits of software- and hardware-based forwarding engines while eliminating the drawbacks of both platforms. To overcome the size limitations of hardware based state tables in the stateful switching architecture (as exemplarily shown in FIG. 2), the embodiment of the invention shown in FIG. 3 extends the hardware-based stateful pipeline 6 with a software-based one 7. This can be implemented by redirecting all new flows to a software-based pipeline 7 and by maintaining per-flow states in the software state table 8. If the software pipeline 7 becomes overloaded because of the excessive traffic, some flows, together with their states, can be eventually moved to the hardware state table 9, effectively offloading the software pipeline 7.

It should be noted that hybrid hardware-software architectures that perform offloading from software to hardware, in order to extend the total number of supported flows, have been exploited for state-less forwarders, such as network switches and routers (for reference, see Roberto Bifulco and Anton Matsiuk: "Towards Scalable SDN Switches: Enabling Faster Flow Table Entries Installation", Proceedings of the 2015 ACM Conference on Special Interest Group on Data Communication (SIGCOMM '15). ACM, New York, N.Y., USA, 343-344. DOI=http://dx.doi.org/10.1145/2785956.2790008, or Naga Katta, Omid Alipourfard, Jennifer Rexford, and David Walker: "Infinite CacheFlow in software-defined networks", Proceedings of the third workshop on Hot topics in software defined networking (HotSDN '14). ACM, New York, N.Y., USA, 175-180. DOI=http://dx.doi.org/10.1145/2620728.2620734). When applying similar principles to the case of stateful forwarders, like the ones addressed by embodiments of the present invention, handling the state transitions becomes critical and cannot be performed seamlessly as in the stateless case. In fact, the forwarding tables of a stateful switch are coupled together by a feedback loop that would be broken by a per-table offloading scheme as the one proposed in the above mentioned documents and related solutions.

Starting from a stateful packet processing architecture with only a single stateful stage merely implemented in hardware, a system in accordance with embodiments of the present invention can be realized by providing the following components:

1. A FSM adaptation technique, which transforms a FSM as specified in the case of stateful switches, e.g., an OpenState switch, into two FSMs that keep the same semantic for the switch behavior, but are ready to be implemented in a hybrid software-hardware switch;

2. A distribution mechanism or offloading strategy that defines when a flow should be handled by the hardware or software part of the FSMs; and 3. A hybrid switch that combines at least two stateful stages, e.g., with one of those implemented in software and the other in hardware.

Hereinafter, these three components will be described in more detail upon making reference to the drawings.

Starting with the FSM adaptation, according to embodiments of the invention FSM adaptation may be achieved by an FSM expansion combined with an FSM splitting. FSM expansion in this context means that an original state machine implemented by the switch's FSM table is extended with additional states and transitions, which are introduced for the sole purpose of supporting the distribution or offloading scheme. FSM splitting in this context means that the new FSM (i.e. expended as described above) is split in two parts, to be implemented respectively in the software and hardware stateful stages. The splitting is straightforwardly implemented by executing in software the newly added transitions created by the FSM expansion. However, the actual transitioning actions for the offloading procedures may require different operations depending on the actual implementation.

As a result of the above modifications/adaptations, one obtains two sets of flow entries that implement the FSM transitions, which can be implemented in the switch architecture shown in FIG. 3. To realize such architecture one can extend a hardware-based FSM (HFSM) with a software-based FSM (SFSM). Each of the FSMs is then handled by its appropriate (hardware and software) stateful switching pipeline 6, 7.

Turning now to the distribution mechanism (listed above as second component), this mechanism generally specifies when a flow should be handled by the hardware or software part of the FSMs. Hereinafter, this mechanism will be described as a hardware offloading scheme, which is motivated by considering an embodiment where all new flows are initially transferred to the software pipeline 7. The hardware offloading scheme will then, i.e. if certain predefined conditions are fulfilled, offload certain flows from the software pipeline 7 to the hardware pipeline 6. To this end, a Hardware Offload Criterion (HOC) will be introduced, which represents a trigger for additional state transitions between two FSMs, as illustrated in FIG. 4.

The HOC is the criterion to move a particular flow (i.e. match/state pair) from the software pipeline 7 to the hardware pipeline 6, thus offloading the software pipeline 7. A particular algorithm for the per-flow HOC evaluation could, for instance, evaluate the number of bytes or packets (i.e. flow weight), the packet rate for a particular flow or its duration, and assign the HOC value accordingly. As will be easily appreciated by those skilled in the art, the algorithm may also consider alternative or additional evaluations on flow statistics in a similar way. In any case, the task of such an algorithm is to keep a balance between fractions of flows handled by both pipelines 6, 7, not overloading the software stage 7 with the processing load and the hardware stage 6 with the number of flows.

Figure 4A:
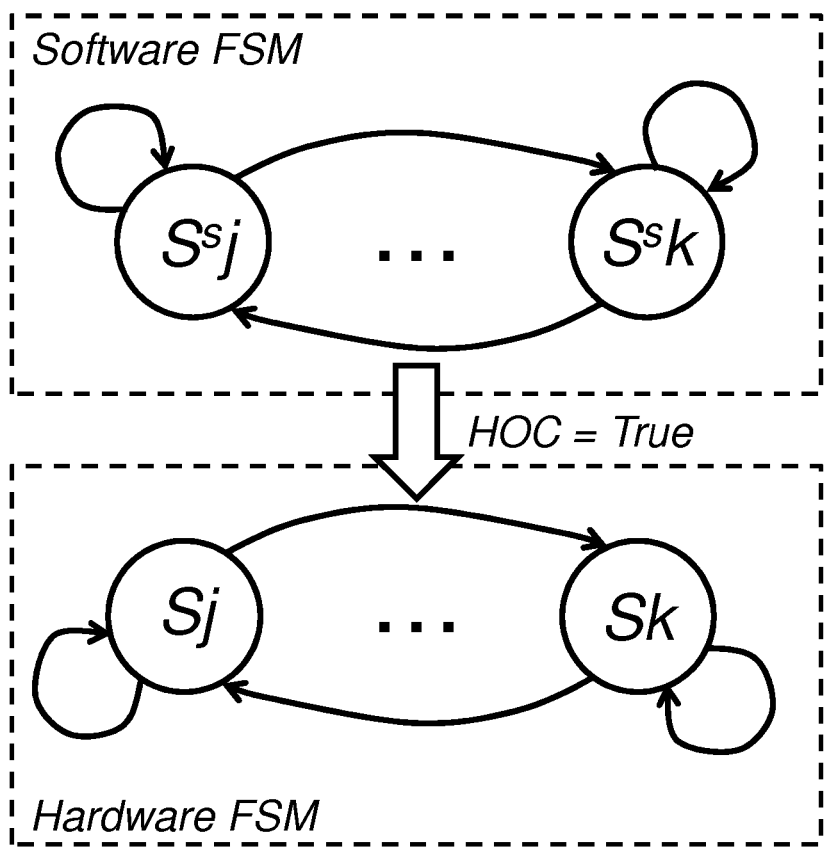
FIG. 4a is a schematic view illustrating an implementation of two combined FSM tables with one-way state transitions in accordance with embodiments of the present invention.
Figure 4B:
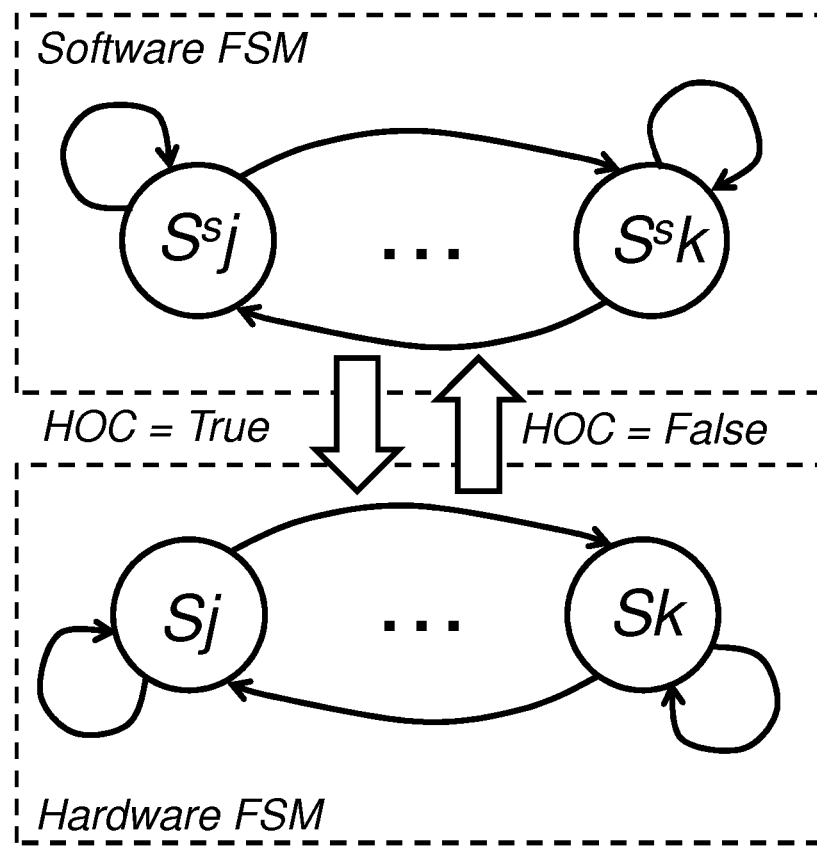
FIG. 4b is a schematic view illustrating an implementation of two combined FSM tables with two-way state transitions in accordance with embodiments of the present invention.

Specifically, FIG. 4 depicts two schemes for the combined FSM. The one-way scheme shown in FIG. 4a implies only transitions from the SFSM down to the HFSM. Here, once a flow is offloaded to the hardware switching pipeline, it stays there until its expiration, e.g., because of the expiration of a given timeout. On the contrary, the two-way scheme shown in FIG. 4b allows the offloaded flows to be moved back to the SFSM if their HOC=False. This, however, complicates the architecture, because the offloading algorithm has to track the HOC values in both FSMs and to perform state transitions accordingly.

Figure 5:
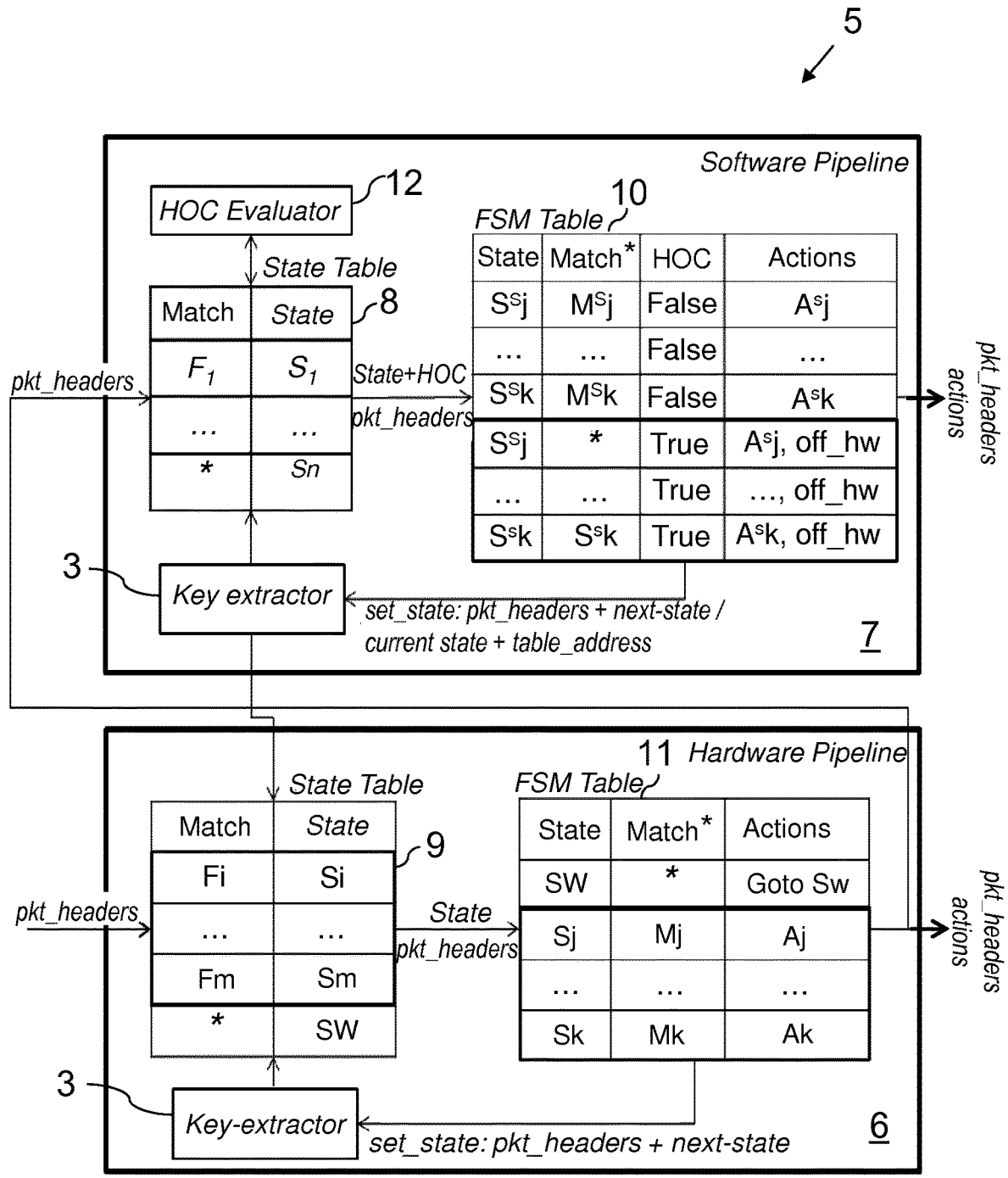
FIG. 5 is a schematic view illustrating a one-way transition software-enhanced stateful pipeline in accordance with embodiments of the present invention.

Turning now to the implementation of a hybrid stateful switch (listed above as third component), FIG. 5 shows a switch 5 in accordance with an embodiment of the present invention that comprises two stateful stages, one in the hardware pipeline 6 and the other in the software pipeline 7. The switch 5 implements the combined FSM of FIG. 4a (since in the switch 5 of FIG. 5 only the software pipeline 7 comprises an evaluation module for the offloading criterion—HOC evaluator 12—, the switch 5 is enabled to only perform a one-way transition from software to hardware).

As can be obtained from FIG. 5, each pipeline 6, 7 has its own state and FSM tables. By default, the Hardware State Table (HST) 9 contains only a single low-priority record with a wildcard match and its associated state is SW (Software). The hardware FSM Table (HFSMT) 11 contains a default record associated with a combination of keys (SW state and a wildcard match), as well as a set of records that implement the HFSM (that results from the FSM adaptation procedure generating a SFSM and a HFSM). One of the HFSMT's 11 entries is associated with the SW state and specifies the action Goto Sw, which redirects packet headers to the Software State Table (SST) 8, i.e., to the stateful stage implemented in the software pipeline 7. Such a redirection may be straightforwardly implemented using "Goto-Table" OpenFlow instruction. Thus, any new flow, which has no associated fine-grained record in the HST 9, is handled by the default record and becomes redirected to the software pipeline 7 for further processing.

In the software pipeline 7, the SST 8 maintains per-flow records as well as a wildcard default state for new flows and passes the state and packet headers to the Software FSM Table (SFSMT) 10. The software FSM table 10 contains an additional match field (denoted 'HOC'), which is used to deal with the offloading (or, more generally, distribution) procedures. In case of HOC=False, a flow and its state is processed completely in the software pipeline 7. On the other hand, if HOC=True, then the switch 5 performs the offloading to hardware of the corresponding flow. In effect, this means that the flow associated with the [match, state] pair is updated with a set_state: next-state instruction, which changes the flow's state in the HST 9. Since the state for such flow in the HST 9 has changed from SW to a different one, subsequent packets belonging to such flow are now handled in the HFSMT 11.

The switch 5 may implement a HOC Evaluator module 12 to perform calculation of the per-flow HOC values, e.g., based on its internal algorithm and predefined criteria, in order to update the corresponding HOC values in the SFSM table 10. For example, the HOC evaluator 12 may be configured to extract per-flow statistics (like bytes/packets counters, flow duration, etc.) from other tables of the pipeline (e.g. metering tables), to compare it against predefined thresholds and to set the HOC values accordingly.

Furthermore, the SFSMT 10 and HFSMT 11, generated as outcome of the FSM adaptation process, comprise off_state_hw and Goto SW actions. Depending on the switch's 5 implementation options, the stateful pipelines 6, 7 may be connected by different means and technologies. For example, the two pipelines 6, 7 may even be implemented using two physically separated datapaths connected by external connection, e.g., in case the software pipeline 7 is realized in an external software switch. Thus, the realization of the off_state_hw and Goto SW is implementation dependent. For example, such actions may require adaptations of the metadata associated with an incoming packet.

The off_state_hw action allows the switch 5 to offload a specific flow (i.e. [match, state] pair) to the HST 9 as follows: If the state of a particular flow must be updated according to the SFSM with a set_state: next_state instruction, than this instruction may simply be modified (e.g. by specifying a different address of the state table) such that the key extractor module 3 redirects it to the HST 9. On the other hand, if the current flow state $S^S_j$ does not need to be updated, but HOC=True, than the off_hw instruction may copy (or modify if $S^S_j \neq S_j$) the current state value in the set_state instruction and direct it to the HST 9.

An implementation of the two-way transition FSM (as shown in FIG. 4*b*), which provides the ability to move offloaded flows back to the software pipeline 7, requires analogous extensions to the hardware pipeline 6 as the ones described for the software pipeline (i.e. the provision of an HOC evaluator 12 and FSM table extensions). In that case, if HOC=False, the HFSMT applies an off_state_sw instruction which directs state table updates from the HFSMT 11 to the SST 8. Those skilled in the art will straightforwardly derive the scheme of such two-way transition stateful pipeline from the one depicted in FIG. 4*b*.

Figure 6:
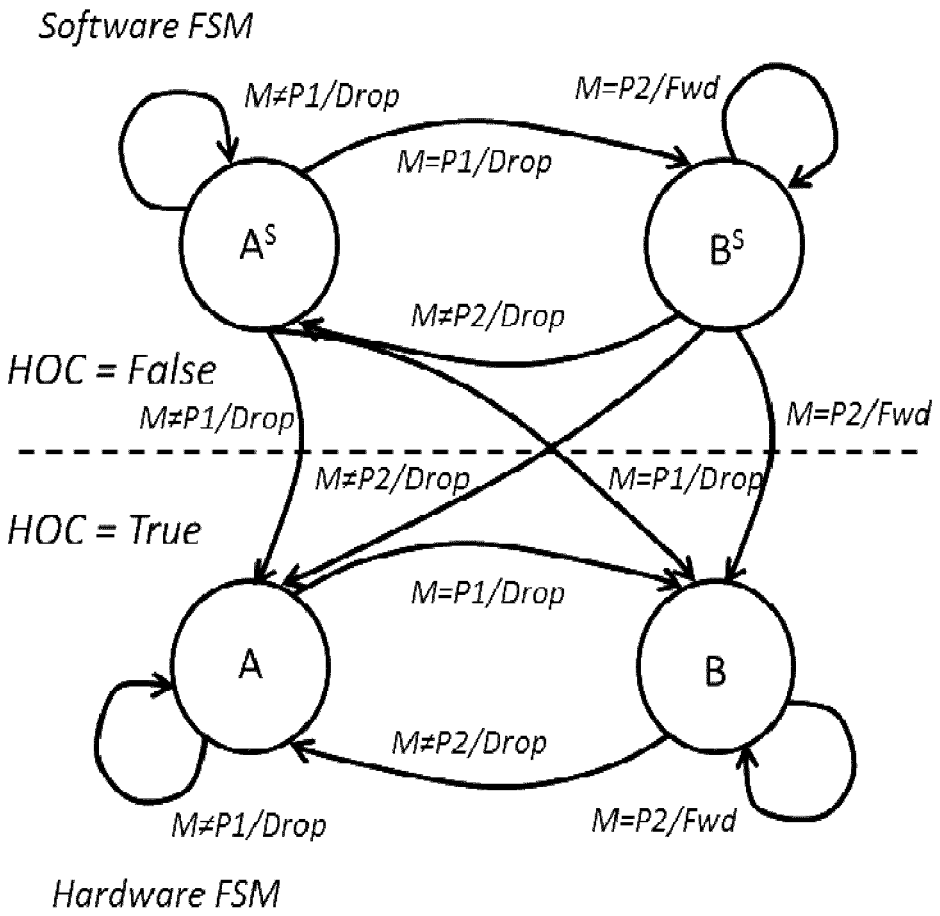
FIG. 6 is a schematic view illustrating a one-way transition FSM for the port knocking application of FIG. 1 in accordance with embodiments of the present invention.

FIG. 6 illustrates an embodiment of the present invention that represents a one-way transition FSM adapted for the port knocking application described in connection with FIG. 1. That is, the FSM shown in FIG. 6 is the FSM generated by the FSM adaptation process when applied to the FSM of FIG. 1. The split between SFSM and HFSM is indicated by the dotted line of FIG. 6. In total, there are implemented four different conditions from software FSM to hardware FSM. To give exemplary explanations of such transitions, if a match M on port P1 fails, the respective packet is dropped, and the system remains in state $A^S$ (if HOC=False) or transits to hardware state A (if HOC=True). On the other hand, if this match is successful, the respective packet is still dropped, but the system performs a switch to state $B^S$ (if HOC=False) or to hardware state B (if HOC=True).

As will be easily appreciated by those skilled in the art, in case of a two-way FSM, four additional state transitions from the HFSM back to the SFSM are needed to satisfy the HOC—False condition.

Figure 7:
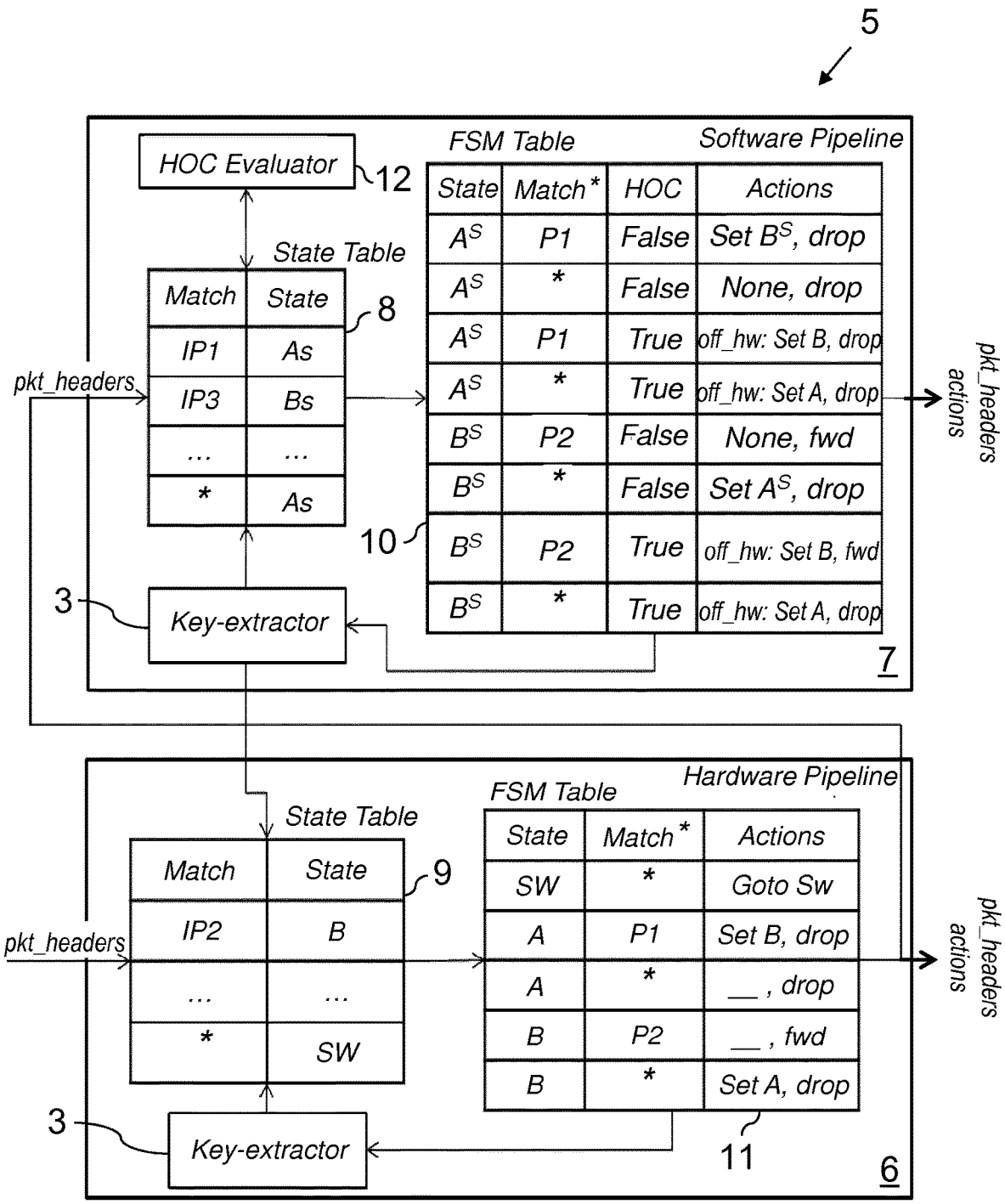
FIG. 7 is a schematic view illustrating a one-way transition software-enhanced stateful pipeline for the port knocking application of FIG. 1 in accordance with embodiments of the present invention.

FIG. 7 represents an implementation of the combined FSM for the port knocking application. Every particular FSM state transition is compiled to the appropriate FSM table, and four state transitions between the FSMs are compiled to the SFSM table as entries with HOC=True and an additional off_hw action. For every new flow a separate state record is maintained in the software state table 8 (e.g. IP1, IP3) and the flows with HOC=True (e.g. flow size or flow rate cross a predefined threshold) are offloaded to the HST 9. Thus, the HST 9 keeps only a limited subset of heavy or rate-intensive flows, offloading the software pipeline 7 at the price of fixed and small number of additional entries in the software FSM table 10.

As should be understood by the above description and accompanying figures, embodiments of the invention implement a software-enhanced stateful packet processing architecture, which effectively combines benefits of software- and hardware-based forwarding engines, while eliminating the drawbacks of both platforms. To overcome the size limitations of hardware based state tables in the stateful switching architecture, embodiments extend the hardware-based stateful pipeline with a software-based one. This can be implemented by redirecting all new flows to a software-based pipeline and by maintaining per-flow states in the software state table. If the software pipeline becomes overloaded because of the excessive traffic, some flows, together with their states, can be eventually moved to the hardware state table, effectively offloading the software pipeline.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

REFERENCE NUMBERS

1 state table
2 FSM table
3 key extractor module
4 controller
5 stateful switch
6 hardware stateful stage
7 software stateful stage
8 software state table, SST
9 hardware state table, HST
10 software FSM table, SFSMT
11 hardware FSM table, HFSMT
12 HOC evaluator While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A stateful network packet processing system, comprising:
   a first stateful stage including a first state table and a first finite state machine ("FSM") table; and
   a second stateful stage including a second state table and a second FSM table;
   wherein the system is configured to perform a distribution operation that defines when a flow should be processed by either the first stateful stage or the second stateful stage or by a combination of the first stateful stage and the second stateful stage,
   wherein at least one of the first FSM table or the second FSM table is extended with states and transitions that support the distribution operation,
   wherein at least one of the first stateful stage or the second stateful stage is configured to execute an evaluation operation comprising executing the distribution operation, and
   wherein the evaluation operation provides a criterion for moving a particular flow from one of the first stateful stage or the second stateful stage to a respective other stateful stage of the first stateful stage or the second stateful stage,
   wherein the first stateful stage and the second stateful stage are included in a software-defined networking ("SDN") switch,
   wherein the first stateful stage is implemented in hardware as a hardware stateful stage and wherein the first state table is a hardware state table ("HST") and wherein the first FSM table is a hardware FSM table ("HFSMT"),
   wherein the second stateful stage is implemented in software as a software stateful stage and wherein the second state table is a software state table ("SST") and wherein the second FSM table is a software FSM table ("SFSMT")
   wherein the evaluation operation translates an evaluation performed on flow and/or packet statistics into a binary variable,
   wherein the software stateful stage is configured to execute the evaluation operation, and
   wherein the evaluation operation comprises executing the distribution operation in a form of a one-way offloading scheme that triggers transitions from the software stateful stage to the hardware stateful stage based on the value of the binary variable.

2. The system according to claim 1, wherein the hardware stateful stage is implemented as a Ternary Content-Addressable Memory ("TCAM") memory-based stage.

3. The system according to claim 1, wherein the software stateful stage is implemented as a combination of a general purpose processor with a dynamic random access memory ("DRAM").

4. The system according to claim 1, wherein each of the first stateful stage and the second stateful stage is configured to derive from a network packet's header a particular value that represents a key for the match fields of the state tables.

5. The system according to claim 4, wherein each of the first stateful stage and the second stateful stage is further configured to pass the particular value together with information on a state associated to the network packet in the respective one of the first FSM table or the second FSM table to a respective one of the first state table or the second state table.

6. The system according to claim 1, wherein the evaluation operation translates an evaluation performed on flow and/or packet statistics into a binary variable.

7. The system according to claim 1, wherein the first stateful stage and the second stateful stage are implemented by using two physically separated data paths that are linked with each other by an external connection.

8. The system according to claim 1, comprising one or more supplemental stateful stages in addition to the first stateful stage and the second stateful stage.

9. A stateful network packet processing system, comprising:
   a first stateful stage including a first state table and a first finite state machine ("FSM") table; and
   a second stateful stage including a second state table and a second FSM table;
   wherein the system is configured to perform a distribution operation that defines when a flow should be processed by either the first stateful stage or the second stateful stage or by a combination of the first stateful stage and the second stateful stage,
   wherein at least one of the first FSM table or the second FSM table is extended with states and transitions that support the distribution operation,
   wherein the first stateful stage is implemented in hardware as a hardware stateful stage and wherein the first state table is a hardware state table ("HST") and wherein the first FSM table is a hardware FSM table ("HFSMT"),
   wherein the second stateful stage is implemented in software as a software stateful stage and wherein the second state table is a software state table ("SST") and wherein the second FSM table is a software FSM table ("SFSMT"), and
   wherein the HST contains only a single low-priority entry with a wildcard match and a software indicating state as an associated state.

10. A stateful network packet processing system, comprising:
    a first stateful stage including a first state table and a first finite state machine ("FSM") table; and
    a second stateful stage including a second state table and a second FSM table;
    wherein the system is configured to perform a distribution operation that defines when a flow should be processed by either the first stateful stage or the second stateful stage or by a combination of the first stateful stage and the second stateful stage,
    wherein at least one of the first FSM table or the second FSM table is extended with states and transitions that support the distribution operation,
    wherein the first stateful stage is implemented in hardware as a hardware stateful stage and wherein the first state table is a hardware state table ("HST") and wherein the first FSM table is a hardware FSM table ("HFSMT"),
    wherein the second stateful stage is implemented in software as a software stateful stage and wherein the second state table is a software state table ("SST") and wherein the second FSM table is a software FSM table ("SFSMT"), and
    wherein the HFSMT contains an entry that is associated with the software indicating state and that specifies an action that redirects matching packets to the SST.

11. The system according to claim 10, wherein the redirection of matching packets from the HFSMT to the SST is implemented by using dedicated OpenFlow instructions.

* * * * *